Patented June 14, 1938

2,120,773

UNITED STATES PATENT OFFICE 2,120,773

COLORED ROOFING GRANULES AND
METHOD OF MAKING THE SAME

Stephen G. Wright, Chicago, Ill.

No Drawing. Application February 7, 1936,
Serial No. 62,873

10 Claims. (Cl. 91—70)

This invention relates to colored roofing granules and a method of preparing the same.

In the production of roofing granules, it is frequently desirable to form a glazed coating thereon, or a coating which is a base for the fixing of various coloring matters. Borax has been suggested in certain modifications as a suitable substance for such a glazing or bonding operation. Borax has, however, several difficulties, among which is its lack of solubility in water.

It has now been discovered that the use of boric oxide (or boric acid) with a sodium oxide material capable of reacting therewith to produce a sodium borate, produces a coating or bonding agent having improved properties. Roofing granules employing boric acid and sodium carbonate, for example, produces a lighter colored granule with pigments such as iron oxide and chromium oxide than is secured by the use of equivalent amounts of borax. At the same time, there is no tendency of the granules to stick together during baking, whereas with borax there is such a tendency. There likewise is a somewhat better coverage by the coating on certain granules than is the case with borax.

In accordance with this invention, rock granules crushed to the desired size are coated with a mixture of boric acid, sodium carbonate and a pigment, and the granules then baked at a high temperature to fix the pigment.

As an example of the invention, 3.9 pounds of boracic acid, 4.5 pounds of washing soda, 10 pounds of iron oxide, 5 pounds of clay were mixed with one ton of rock granules, such as trap rock, which have been previously moistened with 60 pounds of water. Boracic acid goes promptly into solution upon the addition of the washing soda, although equivalent amounts of borax would not dissolve at room temperature. After thorough mixing the granules were baked at a temperature, for example, of about 1700° for a time sufficient to fix the pigment. Normally, this period would be about ten minutes.

The resulting iron oxide coated granules are lighter than when an equivalent amount of borax is used, and at the same time there is no apparent tendency of the granules to stick together during the baking treatment. At the same time, owing to the greater bulk of the ingredients, it may frequently be possible to secure better distribution of the pigment and binder than with the borax.

The reason for the lack of sticking is not known. It is possible that the evolution of carbon dioxide which occurs during the baking has a tendency to keep the granules apart.

Other types of rock granules, of course, may be used, the amount of binder and water being varied in accordance with the porosity of the rock. For example, when using gob the amount of water used will be roughly three times that required for trap rock and the amount of binder may be increased accordingly, although it is not necessary to use quite so great an amount.

Even lighter colors may be secured by using less than a binding proportion of washing soda. A preferred proportion is 8 pounds of boracic acid to 2½ pounds of washing soda per ton of rock. This proportion appears to give the lightest color consistent with fastness and good adherence. Boracic acid itself does not appear to give an insoluble baked binder.

As another example of the invention, 3.9 pounds of boracic acid, 2.5 pounds of washing soda, 10 pounds of iron oxide and 5 pounds of clay were mixed with one ton of trap rock which had been wetted with 60 pounds of water and the coated rock then baked.

The results which occur with iron oxide have likewise been found to occur in a chromium oxide pigment.

Other sodium oxide compounds capable of reacting therewith to produce a sodium borate, may be employed, such as trisodium phosphate, caustic soda and the like.

The reason for the solubility of the sodium borate composition is not understood. It may be that the soluble pentahydrate is formed instead of the common decahydrate.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The method of coloring roofing granules which comprises admixing granules with a minor proportion of heat-stable pigment, boric acid, and sodium carbonate and water, the sodium carbonate being present in an amount less than the combining proportion to form sodium tetraborate, and heating the mixture to produce a water insoluble binder whereby the pigment is affixed to the granules.

2. The method as set forth in claim 1, in which the proportion of boric acid is of the order of 8 pounds of boric acid to 2½ pounds to 5 pounds of washing soda.

3. A roofing granule comprising a rock granule having firmly affixed upon its surface a heat-stable pigment attached to the granule by a binder produced by the interaction of boric acid and a sodium oxide compound capable of reacting with boric acid to produce borax upon the granule.

4. An article as set forth in claim 3, in which the proportions of boric oxide to sodium oxide is of the order of 70 parts of boric oxide to 17 to 35 parts of sodium oxide.

5. An article as set forth in claim 3, in which the pigment is iron oxide.

6. An article as set forth in claim 3, in which the pigment is chromium oxide.

7. The method of coloring roofing granules, which comprises admixing granules with a minor proportion of a heat-stable pigment, and a water solution of boric acid and sodium carbonate decahydrate, the proportions being of the order of 8⅔ to 33⅓ parts of boric acid to 10 parts of carbonate, and heating the mixture to produce a water insoluble binder with which the pigment is affixed to the granules.

8. The method of coloring roofing granules which comprises moistening the granules with water, and admixing therewith powdered boric acid and sodium carbonate and a heat-stable pigment, the sodium carbonate being present in an amount less than the combining proportion to form sodium tetraborate, baking the coated granules at a temperature of the order of 1700° F. to produce a water insoluble binder.

9. The method of coloring roofing granules, which comprises admixing granules with a minor proportion of a heat-stable pigment, a small quantity of boric acid, water, and sodium oxide compound capable of reacting with boric acid to produce borax, and heating the mixture to produce a water-insoluble binder whereby the pigment is affixed to the granules.

10. The method as set forth in claim 9, in which the sodium compound is sodium carbonate.

STEPHEN G. WRIGHT.